United States Patent [19]

Gammon

[11] 4,208,301

[45] Jun. 17, 1980

[54] MICROEMULSION DEFOAMER COMPOSITIONS AND PROCESSES FOR THEIR PRODUCTION AND USE

[75] Inventor: Charles T. Gammon, Sparta, N.J.

[73] Assignee: Diamond Shamrock Corporation, Dallas, Tex.

[21] Appl. No.: 922,674

[22] Filed: Jul. 7, 1978

[51] Int. Cl.² ............................................. B01D 19/04
[52] U.S. Cl. ................................... 252/321; 162/173; 162/179; 252/358
[58] Field of Search ................. 252/321, 358; 166/273, 166/274, 275

[56] References Cited

U.S. PATENT DOCUMENTS

| | | | |
|---|---|---|---|
| 2,390,212 | 12/1945 | Fritz | 252/358 X |
| 2,467,177 | 4/1949 | Zimmer | 252/321 X |
| 2,715,614 | 8/1955 | Snook | 252/358 |
| 2,843,551 | 7/1958 | Leonard et al. | 252/321 X |
| 3,482,632 | 12/1969 | Holm | 166/273 |
| 3,493,048 | 2/1970 | Jones | 166/275 X |
| 3,493,051 | 2/1970 | Gogarty | 166/274 |
| 3,698,479 | 10/1972 | Askew et al. | 166/274 X |
| 4,032,473 | 6/1977 | Berg et al. | 252/358 |

Primary Examiner—Richard D. Lovering
Attorney, Agent, or Firm—Neal T. Levin; Leslie G. Nunn, Jr.

[57] ABSTRACT

Microemulsion defoamer compositions which are oil in water colloidal dispersions are useful in defoaming aqueous systems such as in paper machines and latex paints. These compositions are prepared by mixing a water dispersible organic material, ethylene oxide condensate, coupling agent, water, basic material and antigelling agent.

16 Claims, No Drawings

MICROEMULSION DEFOAMER COMPOSITIONS AND PROCESSES FOR THEIR PRODUCTION AND USE

BACKGROUND OF THE INVENTION

1. Field of the Invention

This invention relates to microemulsion defoamer compositions and their use in defoaming aqueous systems containing foam producing solids.

2. Description of the Prior Art

U.S. Pat. No. 2,715,614—Snook, issued Aug. 16, 1955 describes a defoamer composition for paper machines which is a white semi-fluid aqueous emulsion containing a paraffin hydrocarbon having at least 12 carbon atoms, a partial ester of a polyhydric alcohol and a fatty acid having 14 to 22 carbon atoms, an ester of a monohydric alcohol having less than 9 carbon atoms and a fatty acid having 14 to 22 carbon atoms, an ester of a polyethylene glycol having a molecular weight of from about 200 to about 4000 and a fatty acid having from 14 to 22 carbon atoms and water.

U.S. Pat. No. 2,843,551—Leonard et al, issued July 15, 1958 describes a defoamer composition for latex paint which is a cream colored paste containing a paraffin hydrocarbon, an ester of a polyethylene glycol having a molecular weight greater than 400 and a fatty acid having from 12 to 22 carbon atoms, an aliphatic carboxylic acid having from 6 to 22 carbon atoms and a hydrocarbon soluble organo-polysiloxane having from 1 to 3 alkyl radicals per silicon atom and water.

U.S. Pat. No. 4,032,473—Berg et al, issued June 28, 1977, describes a water based defoamer composition containing a water insoluble mineral hydrocarbon, solid fatty acid diamide, hydrophobic silica particles and a nonionic emulsifier which is a stearyl alcohol ethoxylate. The composition is homogenized to obtain a stable pumpable emulsion having the appearance and consistency of heavy cream.

SUMMARY OF THE INVENTION

Microemulsion defoamer compositions containing a water dispersible or water insoluble organic material, ethylene oxide condensate, coupling agent, water, basic material and antigelling agent are prepared using from about 1 to about 20 parts by weight of the organic material, from about 20 to about 50 parts by weight of ethylene oxide condensate, from about 1 to about 15 parts by weight of coupling agent, from about 76 to about 10 parts by weight of water, from about 0.5 to about 3 parts by weight of basic material and from about 1 to about 5 parts by weight of antigelling agent. These compositions are more stable than conventional defoamer compositions and have lower viscosities. They are prepared by simple mixing and do require use of high shear mixing or homogenization. Foam controlling amounts of these microemulsion defoamer compositions are added to aqueous systems containing foam producing solids to control or prevent foaming. These compositions are useful in defoaming in paper machines and latex paints.

DESCRIPTION OF THE PREFERRED EMBODIMENTS

Microemulsions are quite different from macroemulsions. Microemulsions are fluid, optically clear (transparent or opalescent) and do not separate on standing whereas macroemulsions are white and separate into the two original phases on standing. Properties of microemulsions are described in Prince's book entitled, "Microemulsions Theory and Practice", (Academic Press Inc., N.Y., N.Y. 1977).

Useful microemulsion defoamer compositions may contain the ranges of Indicated parts by weight and Preferred parts by weight ingredients shown below.

|  | Indicated parts by weight | Preferred parts by weight |
| --- | --- | --- |
| water dispersible organic material | 1–20 | 5–15 |
| ethylene oxide condensate | 20–50 | 30–45 |
| coupling agent | 1–15 | 3–11 |
| water | 76–10 | 62–26 |
| basic material | 0.5–3.0 | 0.5–3.0 |
| antigelling agent | 1–5 | 1–5 |

Water dispersible organic materials useful in these defoamer compositions include, but are not limited to: mustard seed oil, castor oil, rice bran oil, soya oil, corn oil, other vegetable oils, animal fats, vegetable fats, mineral seal oil, Stoddard Solvent, fuel oil, diesel oil, petroleum naphtha, paraffinic mineral oil, naphthenic mineral oil, toluene, xylene, benzene, hexane, heptane, octane, dodecane, aliphatic alcohols having from about 10 to about 22 carbon atoms, Oxo alcohol bottoms, long chain or alkyl amides having from about 10 22 carbon atoms, propylene oxide condensates of aliphatic acids, alcohols and esters having at least ten carbon atoms and the like. The term "water dispersible", as used herein, encompasses water insoluble materials. When desired, mixtures of two or more of these organic materials may be used. Mineral seal oil is a preferred organic material. Methyl fatty esters such as methyl oleate may also be used.

Useful amides may be prepared by the reaction of an aliphatic acid with ammonia or an amine such as those listed in the bases below. Suitable aliphatic acids should have at least ten carbon atoms, e.g., lauric, oleic and stearic acids and hydroxylated acids such as ricinoleic acid or naphthenic acids such as are obtained as by-products of petroleum refining. Fatty acid mixtures from natural sources such as tallow, tall or seed oils may be used.

Ethylene oxide condensates useful in these defoamer compositions include ethoxylated alkylphenols, aliphatic alcohols, fatty acids, esters or amides of fatty acids having at lest ten carbon atoms in the hydrophobic moiety, amine or polyoxypropylene glycol. Such condensates may be prepared using any organic compound having a hyrophobic moiety containing at least ten carbon atoms. Ethylene oxide condensates are well known in the art and are used extensively as nonionic surfactants.

Useful condensates may be prepared by ethoxylation of alkylphenols such as octylphenol, nonylphenol, dodecylphenol, dinonylphenol and the like. They may be prepared from aliphatic alcohols or amines having at least ten carbon atoms. Useful alcohols include lauryl alcohol, oleyl alcohol, stearyl alcohol, Oxo alcohols, alcohols prepared by the Ziegler process described in Kirk-Othmer, "Encyclopedia of Chemical Technology", Volume 1, page 740 (John Wiley & Sons, Inc., N.Y., N.Y., Third Edition 1978), or alcohols prepared by hydrogenation of fatty acids, fats and waxes. Amines such as laurylamine, stearylamine or oleylamine may be used. Condensates may also be prepared from fatty acids or esters of fatty acids having at least ten carbon atoms such as lauric acid, stearic acid and oleic acid or from amides obtained by reaction of acids having at least ten carbon atoms with ammonia, primary or secondary amines. Condensates may also be prepared by ethoxylation of polypropylene glycols having limited water solubility. Condensates may be prepared by ethoxylation of propoxylated alcohols such as by reacting 1 to 2 moles of ethylene oxide with a $C_{20}$ alcohol propoxylated with 1 to 2 moles of propylene oxide.

Useful ethylene oxide condensates include monoesters and diesters of polyoxyethylene glycols which are obtained by reacting diethylene glycol, polyoxyethylene glycols and their mixtures with aliphatic monocarboxylic acids having carbon chain lengths of at least ten carbon atoms. Esters may be prepared from straight chain or branched chain aliphatic acids which may be saturated, unsaturated or hydroxylated.

Acids useful in the preparation of these esters include lauric acid, myristic acid, behenic acid, palmitic acid, stearic acid, arachidic acid, tallow fatty acids, oleic acid, linoleic acid, erucic acid, coconut oil fatty acids, tall oil acids and the like as well as mixtures of these acids. These fatty acids are well known articles of commerce and may be used in the form of mixtures such as commercial stearic acid and lauric acid. Commercial fatty acids often contain unsaturated acids of varying carbon chain lengths. Molecular weights of the polyoxyethylene glycols used in the preparation of these esters may be from 106 to as high as 2000.

Various esters as well as the fatty acids and glycols used in their preparation are described in U.S. Pat. No. 2,868,734—De Castro et al, issued Jan. 13, 1959 whose teachings on diesters are incorporated by reference herein. The monooleate, dioleate and ditallowate of polyoxyethylene glycol having a molecular weight of 600 may be used in the practice of this invention.

Ethylene oxide condensates may also be prepared by ethoxylation of vegetable oils such as castor oil. A useful condensate can be prepared by ethoxylating castor oil with 30 moles of ethylene oxide.

The coupling agent may be hexylene glycol, butylene glycol, propylene glycol, ethylene glycol, diethylene glycol, dipropylene glycol, dibutylene glycol, triethylene glycol, tripropylene glycol, a monomethyl ether of propylene glycol, dipropylene glycol or tripropylene glycol, butyl Cellosolve ®, butyl Carbitol ® or Cellosolve ®.

The basic material may be an organic or inorganic material. Useful organic materials include primary, secondary or tertiary amines having less than 10 carbon atoms in the hydrophobic moiety such as monoethanolamine, diethanolamine, triethanolamine, methylamine, dimethylamine, trimethylamine, diethylamine, ethylene diamine, diethylene triamine, higher polyamines, any of the commercial polyethylenimines, octyl amine, morpholine and the like. Useful inorganic materials include bases or basic salts such as ammonia, sodium hydroxide, lithium hydroxide, potassium hydroxide, sodium silicate, sodium borate, trisodium phosphate, sodium carbonate and the like. These bases may be used neat by dispersing them into a part of the organic phase or water phase.

The antigelling agent may be an alcohol such as isopropanol, n-propanol, isobutanol, n-butanol, hexanol, heptanol or the like. It is added to prevent gelling of the emulsion during storage.

Microemulsions may be prepared by mixing the water dispersible organic material and ethylene oxide condensate at about 35° C. If necessary, the mixture may be warmed to obtain a homogeneous blend. The coupling agent or mixture of coupling agents are added slowly while the temperature is maintained at 35° C. Water at 35° C. is then added slowly with moderate agitation until a uniform milky, translucent or cloudy emulsion is formed. While the temperature of the emulsion is maintained at 30°–35° C., the basic material is added to the emulsion with mixing to obtain a clear to slightly hazy colloidal solution or microemulsion. An antigelling agent is added to the microemulsion to finish and protect the emulsion from gelling with time.

Properties of the finished microemulsion are:
Clear to trace hazy fluids (haze produced by saturated fatty acid impurities)
Volatiles (150° C.) 40–42%
LB/Gal 8.1
Product Cloud Point 50°–55° F.
Acid Value 2–10
Viscosity-Brookfield 100–200 cps
Solubility-Forms stable emulsions (5%) in water.

The following test method and apparatus may be used to determine effectiveness of the defoamer composition in holding down foam in white water. A synthetic white water containing groundwood pulp, rosin size and alum and having a pH of 4.5 may be used as the test solution. The tests are conducted at 100° F. to 110° F.

The primary container for the liquid being tested is a 1000 cc tall form beaker. A curved glass outlet fused onto the base of the beaker is connected with a rubber hose to a centrifugal pump which continuously circulates test liquid from the beaker through the pump and back into the beaker. Test liquid is pumped at such a rate that test liquid in the beaker is agitated by the re-entering test liquid to the extent that foam forms. The test liquid is pumped at a rate of about 2 gal/min. Test liquid enters the beaker at a point about 6 cm above the liquid surface and strikes the liquid surface in the beaker at an angle of 90°.

When white water is the test liquid, the test is begun by charging 500 cc of freshly obtained concentrated white water heated to about 100° F. to 110° F. into the beaker. The white water, when quiescent, fills the beaker to a level of about 8.3 cm above the bottom which is marked and labeled the 0 line. The beaker is graduated from the 0 line in 1 cm increments for the purpose of foam height measurements. Line 1 is 1 cm above the 0 line, while Line 2 is 2 cm above the 0 line. The higher the number of seconds, the better the relative defoaming activity of the defoamer composition. It is possible to plot time versus foam height to illustrate defoamer composition performance graphically. A 5% emulsion of the defoamer composition to be tested is added to the white water in the beaker.

The pump and stop watch are then started simultaneously and the time for appearance of the small bubble effect in the white water is noted and recorded in seconds as Start of the test. The test is continued and the times for the foam height to reach Line 1 (1 cm above 0 line) and Line 2 (2 cm above 0 line) are noted and recorded in seconds. These data are shown in Tables F and G as Start, Line 1 and Line 2.

The apparatus and method described above may also be used to evaluate the defoamer composition in any liquid which forms foam during agitation and/or heating.

Other aqueous systems which may be defoamed with these microemulsion defoamer compositions include groundwood pulp, pulp and paper mill effluents, animal glues, other adhesives, latex, starches, other resinous systems, water base paints and the like.

For a fuller understanding of the nature and advantages of this invention, reference may be made to the following examples. These examples are given merely to illustrate the invention and are not to be construed in a limiting sense. All quantities, proportions and percentages are by weight and all references to temperature are ° C. unless otherwise indicated.

EXAMPLE I

A microemulsion defoamer composition are prepared using the ingredients shown in Example in Table A.

The water dispersible organic material, 10 g of mineral seal oil, was charged to a flask equipped with an agitator. Then the ethylene oxide condensate, 40 g polyoxyethylene glycol 600 ditallowate, was added. The coupling agent, a mixture of 2 g hexylene glycol, 3 g butyl Cellosolve ® (ethylene glycol monobutyl ether), 5 g Dowanol ® DPM (dipropylene glycol monomethyl ether) was then added. This mixture was melted at 30°–35° C. and mixed until uniform. Then 35.5 g of water warmed to 30° C.+2° C. was slowly added to the mixture and mixed to obtain a milky emulsion. The basic material, 1.5 g of diethanolamine, was then added to the emulsion and mixed to 30°–35° C. During mixing at 30°–35° C., the emulsion cleared. The emulsion was then cooled to below 30° C. and the antigelling agent, 3.0 g of isopropanol was added. This mixture was mixed well to obtain a microemulsion in the form of a clear to slightly hazy amber liquid. A sample of the emulsion heated at 105° C. for 45 minutes produced 40–42% by weight volatiles. The emulsion had a cloud point of about 50°–55° F. and a density of 8.1 lbs per gallon.

EXAMPLES II–XIX

Microemulsion defoamer compositions were prepared following the procedure given in Example I and using the ingredients shown for Examples II–XIX in Tables A through E.

TABLE A

| MICROEMULSION DEFOAMER COMPOSITIONS | | | | | |
|---|---|---|---|---|---|
| Example Ingredients | I | II | III | IV | V |
| | parts by weight | | | | |
| water dispersible organic material | | | | | |
| mineral seal oil | 10 | 5 | | | |
| Sunthrene 410 | | | 10 | | |
| Gulf 333 oil | | | | 10 | |
| Oxo alcohol bottoms | | | | | 10 |
| ethylene oxide condensate | | | | | |
| PEG 600 ditallow | 40 | 45 | | | |
| PEG 600 dioleate | | | 40 | 40 | 40 |
| coupling agent | | | | | |
| hexylene glycol | 2 | 2 | 2 | 2 | 2 |
| butyl Cellosolve ® | 3 | 3 | 3 | 3 | 3 |
| dipropylene glycol ether | 5 | 5 | 5 | 5 | 5 |
| water | 35.5 | 35.5 | 35.5 | 35.5 | 35.5 |
| basic material | | | | | |
| diethanolamine | 1.5 | 1.5 | 1.5 | 1.5 | 1.5 |
| antigelling agent | | | | | |
| isopropanol | 3 | 3 | 3 | 3 | 3 |
| Total | 100 | 100 | 100 | 100 | 100 |

TABLE B

| MICROEMULSION DEFOAMER COMPOSITIONS | | | | | |
|---|---|---|---|---|---|
| Example Ingredients | VI | VII | VIII | IX | X |
| | parts by weight | | | | |
| water dispersible organic material | | | | | |
| mustard seed oil | 10 | | | 5 | |
| silicone oil (50 cstk) | | 5 | | | |
| #2 fuel oil | | | 10 | | |
| mineral seal oil | | | | | 10 |
| ethylene oxide condensate | | | | | |
| PEG 600 ditallow | 40 | 45 | 40 | 45 | |
| PEG 600 monooleate | | | | | 40 |
| coupling agent | | | | | |
| hexylene glycol | 2 | 2 | 2 | 2 | 2 |
| butyl Cellosolve ® | 3 | 3 | 3 | 3 | 3 |
| dipropylene glycol ether | 5 | 5 | 5 | 5 | 5 |
| water | 35.5 | 35.5 | 35.5 | 35.5 | 35.5 |
| basic material | | | | | |
| diethanolamine | 1.5 | 1.5 | 1.5 | 1.5 | 1.5 |
| antigelling agent | | | | | |
| isopropanol | 3 | 3 | 3 | 3 | 3 |
| Total | 100 | 100 | 100 | 100 | 100 |

TABLE C

| MICROEMULSION DEFOAMER COMPOSITIONS | | | |
|---|---|---|---|
| Example Ingredients | XI | XII | XIII |
| | parts by weight | | |
| water dispersible organic material | | | |
| UCON 385 (propoxylate butanol) | 10 | | |
| methyl oleate | | 10 | 20 |
| ethylene oxide condensate | | | |
| PEG 600 dioleate | 40 | 40 | 30 |
| coupling agent | | | |
| hexylene glycol | 2 | 2 | 2 |
| butyl Cellosolve ® | 3 | 3 | 3 |
| dipropylene glycol ether | 5 | 5 | 5 |
| water | 35.5 | 35.5 | 35.5 |
| basic material | | | |
| diethanolamine | 1.5 | 1.5 | 1.5 |
| antigelling agent | | | |
| isopropanol | 3 | 3 | 3 |
| Total | 100 | 100 | 100 |

TABLE D

| MICROEMULSION DEFOAMER COMPOSITIONS | | | | | |
|---|---|---|---|---|---|
| Example Ingredients | XIV | XV | XVI | XVII | XVIII |
| | parts by weight | | | | |
| water dispersible organic material | | | | | |
| methyl ricinoleate | 10 | | | | |
| propylene glycol monostearate | | 10 | | | |
| oleic dimethylamide | | | 10 | | |
| adipic diester of Oxo alcohol bottoms | | | | | |
| methyl oleate | | | | 10 | |
| ethylene oxide condensate | | | | | |
| PEG 600 dioleate | 40 | 40 | 40 | 40 | |
| ethoxylated (30EO) castor oil | | | | | 40 |
| coupling agent | | | | | |
| hexylene glycol | 2 | 2 | 2 | 2 | 2 |
| butyl Cellosolve ® | 3 | 3 | 3 | 3 | 3 |
| dipropylene glycol ether | 5 | 5 | 5 | 5 | 5 |
| water | 35.5 | 35.5 | 35.5 | 35.5 | 35.5 |
| basic material | | | | | |
| diethanolamine | 1.5 | 1.5 | 1.5 | 1.5 | 1.5 |
| antigelling agent | | | | | |
| Isopropanol | 3 | 3 | 3 | 3 | 3 |
| Total | 100 | 100 | 100 | 100 | 100 |

TABLE E

MICROEMULSION DEFOAMER COMPOSITION

| Example<br>Ingredients | XIX<br>parts by weight |
| --- | --- |
| water dispersible organic material | |
| mineral seal oil | 10 |
| ethylene oxide condensate | |
| PEG 600 ditallow | 40 |
| coupling agent | |
| hexylene glycol | 2 |
| butyl Cellosolve ® | 3 |
| dipropylene glycol ether | 5 |
| water | 35.5 |
| basic material | |
| 45% potassium hydroxide | 1.5 |
| antigelling agent | |
| isopropanol | 3 |
| Total | 100 |

EXAMPLE XX

Microemulsion defoamer compositions prepared in Examples I–XIX were evaluated as white water defoamers using the procedure described in the specification. Results of these tests are given in Tables F and G.

TABLE F

Evaluation of Defoamer Compositions in Examples I–IX at 5% Emulsion in White Water at pH of 4.5 and at 100° F.

| Defoamer Composition of Example | Start | Retention Line 1 | Time (sec) Line 2 |
| --- | --- | --- | --- |
| I | 10 | 50 | 85 |
|   | 10 | 50 | 85 |
| II | 7 | 25 | 63 |
|   | 7 | 25 | 63 |
| III | 7 | 35 | 65 |
|   | 7 | 35 | 65 |
| IV | 10 | 58 | 90 |
|   | 10 | 55 | 90 |
| V | 10 | 57 | 90 |
|   | 10 | 58 | 90 |
| VI | 7 | 25 | 45 |
|   | 7 | 28 | 50 |
| VII | 7 | 10 | 20 |
|   | 7 | 10 | 20 |
| VIII | 7 | 30 | 60 |
|   | 7 | 30 | 65 |
| IX | 7 | 15 | 45 |
|   | 7 | 15 | 45 |

TABLE G

Evaluation of Defoamer Composition in Examples XI–XIX at 5% Emulsion in White Water at pH of 4.5 and at 110° F.

| Defoamer Composition of Example | Start | Retention Line 1 | Time (sec) Line 2 |
| --- | --- | --- | --- |
| Blank | — | 15 | 21 |
| XI | 12 | 58 | 95 |
| XIII | 10 | 50 | 80 |
| XIV | 12 | 45 | 68 |
| XV | 10 | 50 | 90 |
| XVI (heated) | 18 | 70 | 85 |
| XVII | 5 | 25 | 45 |
| XVIII | 12 | 35 | 75 |
| XIX | 10 | 30 | 65 |

EXAMPLE XXI

This example demonstrates use of the defoaming compositions of Examples I, XI, XIII and XVIII as latex paint defoamers using the following Shaker Test.

Holddown foam tests were conducted by adding 0.5% by wt of each defoamer composition based on the weight of latex to Rhoplex AC-490 (Rohm and Haas Company) acrylic latex. The defoamer composition was added to 125 cc of the latex weighed into a 250 cc can. Samples prepared with and without defoamer composition were shaken on a Red Devil paint shaker for 5 min. Immediately after shaking, the density (wt/gal) of each sample was determined. The decrease in density of each sample was compared with the control to determine the amount of air entrapped and the following results were obtained.

|   | Density (wt/gal) | % Air Entrapped |
| --- | --- | --- |
| Control (No Shaking) | 8.80 | — |
| Blank (No Defoamer) | 5.98 | 32 |
| 0.5% (by wt) of Example I | 6.88 | 21.8 |
| 0.5% (by wt) of Example XI | 7.44 | 15.5 |
| 0.5% (by wt) of Example XIII | 7.78 | 11.6 |
| 0.5% (by wt) of Example XVIII | 7.04 | 19.7 |

Results of these tests show that incorporation of 0.5% by weight of these defoamer compositions based on the weight of the latex to Rhoplex AC-490 results in substantial reductions in air entrainment.

While the invention has been described with reference to certain specific embodiments thereof, it is understood that it is not to be so limited since alterations and changes may be made therein which are within the full and intended scope of the appended claims.

What is claimed is:

1. A microemulsion defoamer composition comprising:
   (a) from about 1 to about 20 parts by weight of water dispersible organic material,
   (b) from about 20 to about 50 parts by weight of ethylene oxide condensate selected from the group consisting of ethoxylated polyoxypropylene glycol, ethoxylated alkylphenol, ethoxylated alcohol, ethoxylated fatty acid, ethoxylated ester of fatty acid, ethoxylated amide of fatty acid and ethoxylated alkylamine wherein there are at least ten carbon atoms in the hydrophobic moiety,
   (c) from about 1 to about 15 parts by weight of coupling agent selected from the group consisting of hexylene glycol, butylene glycol, propylene glycol, ethylene glycol, diethylene glycol, dipropylene glycol, dibutylene glycol, triethylene glycol, tripropylene glycol, monomethyl ether of propylene glycol, monomethyl ether of dipropylene glycol, monomethyl ether of tripropylene glycol, monobutyl ether of ethylene glycol, monobutyl ether of diethylene glycol and monoethyl ether of ethylene glycol,
   (d) from about 76 to about 10 parts by weight of water,
   (e) from about 0.5 to about 3 parts by weight of basic material, and
   (f) from about 1 to about 5 parts by weight of antigelling agent which is an alcohol having less than eight carbon atoms.

2. The composition of claim 1 wherein the water dispersible organic material is selected from the group consisting of mineral seal oil, Stoddard Solvent, fuel oil, diesel oil, petroleum naphtha, paraffinic mineral oil, naphthenic mineral oil, toluene, xylene, benzene, hexane, heptane, octane, dodecane, aliphatic alcohol having from about 10 to about 22 carbon atoms, Oxo alcohol bottoms, methyl fatty esters, mustard seed oil, castor oil, rice bran oil, soya oil, corn oil, alkyl amide having from about 10 to about 22 carbon atoms in the alkyl radical, propylene oxide condensates of aliphatic acid having at least ten carbon atoms and propylene oxide condensate of alcohol having at least ten carbon atoms.

3. The composition of claim 1 wherein the basic material is selected from the group consisting of ammonia, sodium hydroxide, lithium hydroxide, potassium hydroxide, primary amine, secondary amine, tertiary amine, polyamine and morpholine wherein these are less than ten carbon atoms in each alkyl radical in the amine.

4. The microemulsion defoamer composition of claim 1 wherein there is present
   (a) from about 1 to about 20 parts by weight of mineral oil,
   (b) from about 20 to about 50 parts by weight of ethoxylated fatty acid,
   (c) from about 1 to about 15 parts by weight of a mixture of hexylene glycol, monobutyl ether of ethylene glycol and dipropylene glycol ether,
   (d) from about 76 to about 10 parts by weight of water,
   (e) from about 0.5 to about 3 parts by weight of diethanolamine, and
   (f) from about 1 to about 5 parts by weight of isopropanol.

5. The microemulsion defoamer composition of claim 1 wherein there is present
   (a) from about 1 to about 20 parts by weight of fuel oil,
   (b) from about 20 to about 50 parts by weight of ethoxylated fatty acid,
   (c) from about 1 to about 15 parts by weight of a mixture of hexylene glycol, monobutyl ether of ethylene glycol and dipropylene glycol ether,
   (d) from about 76 to about 10 parts by weight of water,
   (e) from about 0.5 to about 3 parts by weight of diethanolamine, and
   (f) from about 1 to about 5 parts by weight of isopropanol.

6. The microemulsion defoamer composition of claim 1 wherein there is present
   (a) from about 1 to about 20 parts by weight of propoxylated butanol,
   (b) from about 20 to about 50 parts by weight of ethoxylated fatty acid,
   (c) from about 1 to about 15 parts by weight of a mixture of hexylene glycol, monobutyl ether of ethylene glycol and dipropylene glycol ether,
   (d) from about 76 to about 10 parts by weight of water,
   (e) from about 0.5 to about 3 parts by weight of diethanolamine, and
   (f) from about 1 to about 5 parts by weight of isopropanol.

7. The microemulsion defoamer composition of claim 1 wherein there is present
   (a) from about 1 to about 20 parts by weight of methyl fatty ester,
   (b) from about 20 to about 50 parts by weight of ethoxylated fatty acid,
   (c) from about 1 to about 15 parts by weight of a mixture of hexylene glycol, monobutyl ether of ethylene glycol and dipropylene glycol ether,
   (d) from about 76 to about 10 parts by weight of water,
   (e) from about 0.5 to about 3 parts by weight of diethanolamine, and
   (f) from about 1 to about 5 parts by weight of isopropanol.

8. A microemulsion defoamer composition comprising:
   (a) from about 1 to about 20 parts by weight of water dispersible organic material selected from the group consisting of mineral seal oil, fuel oil, paraffinic mineral oil, naphthenic mineral oil, Oxo alcohol bottoms, methyl fatty ester, mustard seed oil, alkyl amide having from about 10 to about 22 carbon atoms in the alkyl radical, propylene oxide condensates of aliphatic acid having at least ten carbon atoms, silicone oil and propoxylated butanol,
   (b) from about 20 to about 50 parts by weight of ethylene oxide condensate selected from the group consisting of ethoxylated fatty acid and ethoxylated ester of fatty acid,
   (c) from about 1 to about 15 parts by weight of coupling agent selected from the group consisting of hexylene glycol, dipropylene glycol ether and monobutyl ether of ethylene glycol,
   (d) from about 76 to about 10 parts by weight of water,
   (e) from about 0.5 to about 3 parts by weight of basic material selected from the group consisting of potassium hydroxide and secondary amine wherein these are less than ten carbon atoms in each alkyl radical in the amine, and
   (f) from about 1 to about 5 parts by weight of antigelling agent which is an alcohol having less than eight carbon atoms.

9. The microemulsion defoamer composition of claim 8 wherein there is present:
   (a) from about 1 to about 20 parts by weight of water dispersible organic material selected from the group consisting of mineral seal oil, fuel oil, paraffinic mineral oil, naphthenic mineral oil, Oxo alcohol bottoms, methyl fatty ester, mustard seed oil and propoxylated butanol,
   (b) from about 20 to about 50 parts by weight of ethylene oxide condensate selected from the group consisting of ethoxylated fatty acid and ethoxylated ester of fatty acid,
   (c) from about 1 to about 15 parts by weight of coupling agent selected from the group consisting of hexylene glycol, dipropylene glycol ether and monobutyl ether of ethylene glycol,
   (d) from about 76 to about 10 parts by weight of water,
   (e) from about 0.5 to about 3 parts by weight of basic material selected from the group consisting of potassium hydroxide and secondary amine wherein there are less than ten carbon atoms in each alkyl radical in the amine, and
   (f) from about 1 to about 5 parts by weight of antigelling agent which is an alcohol having less than eight carbon atoms.

10. The microemulsion defoamer composition of claim 8 wherein there is present:
    (a) from about 1 to about 20 parts by weight of said water dispersible organic material,
    (b) from about 20 to about 50 parts by weight of ethylene oxide condensate selected from the group consisting of ditallow ester of polyoxyethylene glycol having a molecular weight of 600, dioleate ester of polyoxyethylene glycol having a molecular weight of 600 and ethoxylated castor oil, (c) from about 1 to about 15 parts by weight of hexylene glycol, monobutyl ether of ethylene glycol and dipropylene glycol ether, (d) from about 76 to about 10 parts by weight of water, (e) from about 0.5 to about 3 parts by weight of diethanolamine, and (f) from about 1 to about 5 parts by weight of isopropanol.

11. A microemulsion defoamer composition comprising:

(a) from about 1 to about 20 parts by weight of mineral seal oil, (b) from about 20 to about 50 parts by weight of ethylene oxide condensate of ditallow ester of polyoxyethylene glycol having a molecular weight of 600, (c) from about 1 to about 15 parts by weight of hexylene glycol, monobutyl ether of ethylene glycol and dipropylene glycol ether, (d) from about 76 to about 10 parts by weight of water, (e) from about 0.5 to about 3 parts by weight of diethanolamine, and (f) from about 1 to about 5 parts by weight of isopropanol.

12. A process of producing the composition of claim 1 comprising (a) mixing the organic material, ethylene oxide condensate and coupling agent until uniform, (b) adding the water slowly to obtain a milky emulsion, (c) adding the basic material, (d) mixing to obtain the microemulsion, and (e) adding the antigelling agent to stabilize the microemulsion.

13. A method of defoaming an aqueous system comprising adding a foam controlling amount of the defoamer composition of claim 1 to the aqueous system.

14. A method of defoaming white water in papermaking comprising adding a foam controlling amount of the defoamer composition of claim 1 to white water.

15. A method of foam prevention in a water based protective coating comprising adding a foam controlling amount of the defoamer composition of claim 1 to the coating.

16. A method of foam prevention in a water based adhesive comprising adding a foam controlling amount of the defoamer composition of claim 1 to the adhesive.

* * * * *